US011195387B1

(12) United States Patent
Chauhan et al.

(10) Patent No.: US 11,195,387 B1
(45) Date of Patent: Dec. 7, 2021

(54) DYNAMIC AUTOMATIC TELLER MACHINE (ATM) REFILLING AND PRE-STAGING ATM TRANSACTIONS

(71) Applicant: Bank of America Corporation, Charlotte, NC (US)

(72) Inventors: Sandeep Kumar Chauhan, Hyderabad (IN); Ravikiran Subramanya Rao, Hyderabad (IN); Sneha Padiyar, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/887,548

(22) Filed: May 29, 2020

(51) Int. Cl.
*G07F 19/00* (2006.01)
*G06Q 20/38* (2012.01)
*G06Q 20/40* (2012.01)

(52) U.S. Cl.
CPC ......... *G07F 19/211* (2013.01); *G06Q 20/386* (2020.05); *G06Q 20/40* (2013.01); *G07F 19/209* (2013.01)

(58) Field of Classification Search
CPC .... G07F 19/211; G07F 19/209; G07F 19/206; G07F 19/207; G06Q 20/386; G06Q 20/40
See application file for complete search history.

(56) References Cited

U.S. PATENT DOCUMENTS

| | | | | |
|---|---|---|---|---|
| 4,239,447 A * | 12/1980 | Bach | ........................ | B60P 3/03 180/313 |
| 4,729,444 A * | 3/1988 | Tubman | .................... | B60P 3/03 109/45 |
| 5,266,944 A * | 11/1993 | Carroll | ................. | G08B 25/009 340/573.4 |
| 5,620,079 A * | 4/1997 | Molbak | ..................... | G07G 5/00 194/217 |
| 5,799,288 A * | 8/1998 | Tanaka | .................. | G06Q 20/108 705/43 |
| 5,907,286 A * | 5/1999 | Kuma | ....................... | G07C 9/33 340/5.5 |
| 5,918,910 A * | 7/1999 | Stillwagon | ............ | G09F 3/0288 283/67 |
| 6,494,776 B1 * | 12/2002 | Molbak | ................... | G07F 9/002 453/32 |
| 7,428,873 B1 * | 9/2008 | Searle | ...................... | E05G 1/005 109/24 |
| 7,861,924 B1 * | 1/2011 | Block | ...................... | G07F 19/20 235/379 |
| 9,380,421 B1 | 6/2016 | Vltavsky | | |
| 10,154,372 B1 | 12/2018 | Vltavsky et al. | | |
| 10,248,935 B2 * | 4/2019 | DeLuca | .................. | G01S 19/13 |

(Continued)

FOREIGN PATENT DOCUMENTS

CN 201532576 U 7/2010
CN 201557203 U 8/2010

*Primary Examiner* — Daniel I Walsh
(74) *Attorney, Agent, or Firm* — Banner & Witcoff, Ltd.; Michael A. Springs

(57) ABSTRACT

Aspects of the disclosure relate to an automatic teller machine (ATM) network. A computing device may monitor operations in the ATM network. The computing device may determine an ATM refill route for a cash truck based on the monitoring the ATM network and/or based on refill notifications sent by an ATM. An ATM may communicate with a second ATM to pre-stage a user transaction at the second ATM.

10 Claims, 11 Drawing Sheets

(56) References Cited

U.S. PATENT DOCUMENTS

| | | | |
|---|---|---|---|
| 10,634,547 B1* | 4/2020 | Honig | G06Q 20/18 |
| 10,713,632 B1* | 7/2020 | Shah | G06Q 20/1085 |
| 2002/0100399 A1* | 8/2002 | Young | G07D 11/125 |
| | | | 109/24.1 |
| 2002/0120572 A1* | 8/2002 | Bellucci | G06Q 20/1085 |
| | | | 705/43 |
| 2002/0189920 A1* | 12/2002 | Molbak | G07F 5/24 |
| | | | 194/347 |
| 2004/0117061 A1* | 6/2004 | Angove | G07F 19/203 |
| | | | 700/236 |
| 2004/0215566 A1* | 10/2004 | Meurer | G06Q 10/10 |
| | | | 705/43 |
| 2005/0010525 A1* | 1/2005 | Ross | G06Q 20/1085 |
| | | | 705/43 |
| 2005/0029168 A1* | 2/2005 | Jones | G07D 11/16 |
| | | | 209/534 |
| 2005/0183928 A1* | 8/2005 | Jones | G07D 11/50 |
| | | | 194/207 |
| 2006/0028341 A1* | 2/2006 | Bartholf | G08B 15/02 |
| | | | 340/570 |
| 2006/0173779 A1* | 8/2006 | Bennett | G06Q 20/14 |
| | | | 705/40 |
| 2007/0187485 A1* | 8/2007 | Aas | G07D 11/135 |
| | | | 235/379 |
| 2008/0111679 A1* | 5/2008 | Ogg | G08B 21/0272 |
| | | | 340/539.13 |
| 2008/0116254 A1* | 5/2008 | Sleeman | G07F 19/20 |
| | | | 235/375 |
| 2008/0136636 A1* | 6/2008 | Forrest | G08B 13/2402 |
| | | | 340/572.1 |
| 2009/0309694 A1* | 12/2009 | Nichols | G06Q 20/389 |
| | | | 340/5.7 |
| 2010/0059587 A1* | 3/2010 | Miller | G06Q 20/4014 |
| | | | 235/379 |
| 2010/0198396 A1* | 8/2010 | Brexel | G07D 11/25 |
| | | | 700/219 |
| 2010/0230231 A1* | 9/2010 | Uesaka | G07D 11/40 |
| | | | 194/206 |
| 2011/0161397 A1* | 6/2011 | Bekiares | H04L 67/24 |
| | | | 709/203 |
| 2011/0191243 A1 | 8/2011 | Allen | |
| 2011/0208644 A1* | 8/2011 | Doi | G06Q 50/28 |
| | | | 705/39 |
| 2011/0258090 A1* | 10/2011 | Bosch | G06Q 40/02 |
| | | | 705/30 |
| 2013/0257613 A1* | 10/2013 | Jarman | G08B 25/016 |
| | | | 340/539.11 |
| 2013/0297463 A1* | 11/2013 | Garber | G06Q 10/087 |
| | | | 705/28 |
| 2015/0066564 A1* | 3/2015 | Neilan | G06Q 10/06315 |
| | | | 705/7.25 |
| 2015/0178670 A1* | 6/2015 | Angus | G06Q 10/08 |
| | | | 705/28 |
| 2016/0012403 A1* | 1/2016 | Kursun | G06Q 20/321 |
| | | | 705/44 |
| 2016/0012411 A1* | 1/2016 | Kursun | G06Q 40/02 |
| | | | 705/42 |
| 2016/0078416 A1* | 3/2016 | DeLuca | G06Q 20/1085 |
| | | | 705/43 |
| 2016/0267438 A1 | 9/2016 | Sobol et al. | |
| 2016/0321627 A1 | 11/2016 | McCracken et al. | |
| 2017/0134214 A1* | 5/2017 | Sethuraman | H04W 4/021 |
| 2017/0140353 A1 | 5/2017 | Burdick | |
| 2018/0108196 A1* | 4/2018 | Abner | G07C 9/00182 |
| 2018/0204424 A1 | 7/2018 | Licht et al. | |
| 2018/0211190 A1* | 7/2018 | Guo | G06Q 10/08355 |
| 2019/0347643 A1* | 11/2019 | Skelsey | G06Q 20/204 |
| 2020/0090092 A1* | 3/2020 | Cantley | G06Q 10/06315 |
| 2020/0133271 A1* | 4/2020 | Dey | G05D 1/0248 |
| 2020/0329368 A1 | 10/2020 | Sharma et al. | |
| 2020/0356979 A1 | 11/2020 | Dadhaniya et al. | |
| 2021/0118052 A1 | 4/2021 | Walser | |

\* cited by examiner

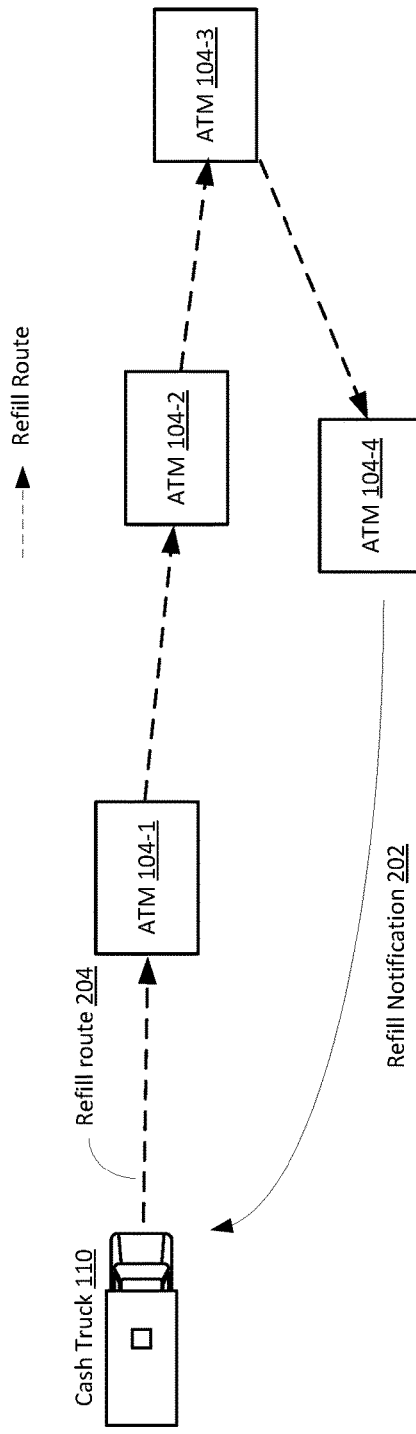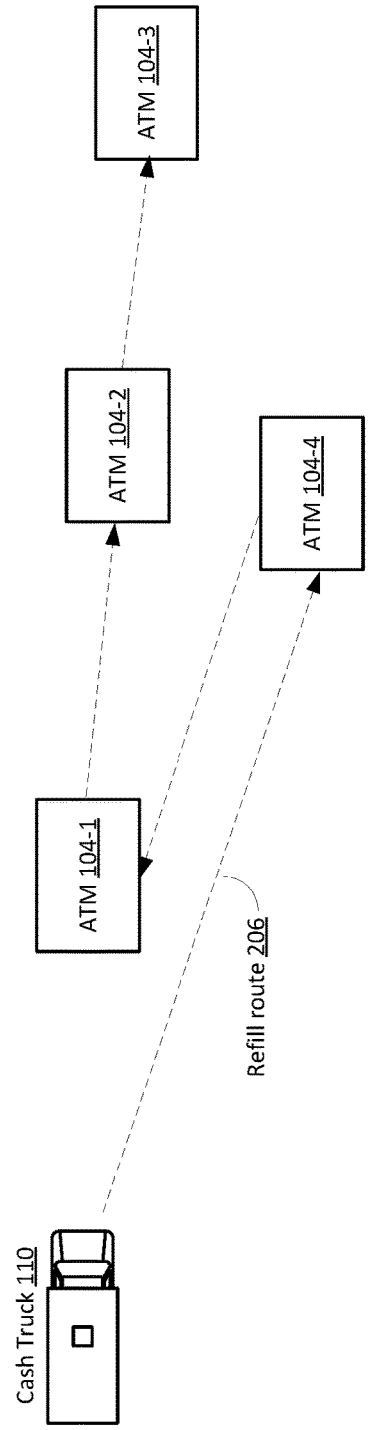
FIG. 2A
FIG. 2B

DYNAMIC AUTOMATIC TELLER MACHINE (ATM) REFILLING AND PRE-STAGING ATM TRANSACTIONS

TECHNICAL FIELD

Aspects described herein generally relate to facilitating and monitoring automatic teller machine (ATM) operations via enhanced communication protocols.

BACKGROUND

ATM networks operated by banks provide various financial services for customers (e.g., cash withdrawal, deposits, account information, etc.). ATM monitoring servers monitor ATM operations to identify issues and also facilitate cash refilling operations. For example, an ATM monitoring server may determine that an ATM is out of cash and alert an employee, who may then dispatch a cash truck to the ATM. However, the ATMs do not have an ability to dynamically control these operations, or deliver information associated with these operations to an end-user.

SUMMARY

Aspects of the disclosure provide solutions that address and overcome technical problems associated with ATM refilling operations. In particular, one or more aspects of the disclosure relate to providing user alerts and dynamically determining cash truck routes for ATM refilling.

In accordance with one or more arrangements, an automatic teller machine (ATM) refilling system may comprise a cash dispenser office server and an internet of things (IOT)-enabled module, associated with a cash truck. The cash dispenser office server may comprise at least one first processor, a first communication interface communicatively coupled to the at least one first processor, and a first memory storing computer-readable instructions that, when executed by the at least one first processor, cause the cash dispenser office server to perform one or more steps. For example, the cash dispenser office server may receive, via the first communication interface, a refill notification from an ATM, the refill notification comprising an indicator associated with an ATM. The cash dispenser office server may send, to the ATM, refill information comprising an indication of a cash truck. The internet of things (IOT)-enabled module, associated with the cash truck, may comprise at least one second processor, a second communication interface communicatively coupled to the at least one second processor, and a second memory storing second computer-readable instructions that, when executed by the at least one second processor, cause the IOT-enabled module to perform one or more steps. For example, the IOT-enabled module may send, via the second communication interface to the ATM, a message comprising an indication of a location of the cash truck.

In some arrangements, the ATM may comprise at least one third processor, a third communication interface communicatively coupled to the at least one third processor, and a third memory storing third computer-readable instructions that, when executed by the at least one third processor, cause the ATM to perform one or more steps. For example, the ATM may send, via the third communication interface, a push notification to a mobile device.

In some arrangements, the ATM may determine, based on the indication of the real-time location of the cash truck, an estimated time of arrival (ETA) of the cash truck. The push notification may comprise the ETA of the cash truck.

In some arrangements, the mobile device may comprise at least one fourth processor, a fourth communication interface communicatively coupled to the at least one fourth processor, and a fourth memory storing fourth computer-readable instructions that, when executed by the at least one fourth processor, cause the mobile device to perform one or more steps. For example, the mobile device may send, via the fourth communication interface a beacon signal comprising a mobile device indicator.

In some arrangements, the ATM may determine, based on the beacon signal, that the mobile device is associated with an authorized user of the ATM. In some arrangements, the ATM may send the refill notification based on at least one selected from: available cash at the ATM; available denominations at the ATM; average cash withdrawal rate; average transaction rate at the ATM; average number of users at the ATM; and combination thereof.

In some arrangements, the cash dispenser office server may determine, based on the refill notification, a refill route for the cash truck. The refill route may comprise the ATM and one or more second ATMs. The cash dispenser office server may send, to the IOT-enabled module, an indication of the refill route.

In some arrangements, the determining the refill route may comprise modifying a default refill route, comprising the ATM and the one or more second ATMs, to prioritize the ATM.

In some arrangements, the message may further comprise the indication of the refill route. In some arrangements, the cash dispenser office server may send an indication of cash value to be delivered to the ATM. In some arrangements, the indication of the cash truck may be an indication of the IOT-enabled module associated with the cash truck.

In accordance with one or more arrangements, an internet of things (IOT)-enabled module, associated with a cash truck, may perform one or more steps. For example, the IOT-enabled module may receive, from a first automatic teller machine (ATM), a refill notification, wherein the refill notification may comprise an indicator associated with the first ATM. The IOT-enabled module may determine, based on the refill notification, a refill route for the cash truck. The refill route may comprise the first ATM and one or more second ATMs. The refill route may prioritize the first ATM. The IOT-enabled module may send, to the first ATM, a message comprising an indication of a location of the cash truck.

In some arrangements, the refill notification may comprise an indication of the cash required at the first ATM. In some arrangements, the message may comprise an indication of the refill route.

In some arrangements, the IOT-enabled module may receive, from one or more second ATMs, cash availability notification messages. The IOT-enabled module may determine the refill route based on the cash availability notification messages.

In some arrangements, a cash availability notification message from an ATM of the one or more second ATMs may comprise at least one selected from: available cash values at the ATM; available denominations at the ATM; average cash withdrawal rate; average transaction rate at the ATM; and combination thereof.

In some arrangements, the IOT-enabled module may determine, based on the cash availability notification messages, respective estimated times at which the ATMs will run out of cash. The determining the refill route may comprise determining the refill route based on the respective estimated times.

In some arrangements, the IOT-enabled module may determine, based on the cash availability notification messages, available cash values at the respective ATMs. The determining the refill route may comprise determining the refill route based on the respective available cash values.

In some arrangements, the determining the refill route may comprise modifying a default refill route, comprising the first ATM and the one or more second ATMs, to prioritize the first ATM.

In another embodiment in accordance with one or more arrangements, an automatic teller machine ATM system with a pre-staging mechanism may comprise a first ATM and a second ATM. The first ATM may comprise at least one first processor, a first communication interface communicatively coupled to the at least one first processor, and a first memory storing computer-readable instructions that, when executed by the at least one first processor, cause the first ATM to perform one or more steps. For example, the first ATM may send, via the first communication interface to the second ATM, a first message indicating a request for cash availability status at the second ATM. The first ATM may receive, from the second ATM, a second message indicating a cash availability status at the second ATM. The first ATM may send, to the second ATM, a request to pre-stage a transaction at the second ATM. The second ATM may comprise at least one second processor, a second communication interface communicatively coupled to the at least one second processor, and a second memory storing second computer-readable instructions that, when executed by the at least one second processor, cause the second ATM to perform one or more steps. For example, the second ATM may pre-stage, based on receiving the request, the transaction at the second ATM.

In some arrangements, the first ATM may determine a requested cash value at the first ATM, wherein sending the first message comprises determining that available cash value at the first ATM is less than the requested cash value.

In some arrangements, the first message may comprise an indication of the requested cash value.

In some arrangements, the pre-staging the transaction at the second ATM may comprise reserving, at the second ATM, the requested cash value.

In some arrangements, the second message may comprise an indication that the second ATM contains cash corresponding to the requested cash value.

In some arrangements, the system may further comprise a mobile device comprising at least one third processor, a third communication interface communicatively coupled to the at least one third processor, and a third memory storing third computer-readable instructions that, when executed by the at least one third processor, cause the mobile device to perform one or more steps. For example, the mobile device may send, via the third communication interface a beacon signal comprising a mobile device indicator. The first ATM may determine, based on the beacon signal, that the mobile device is associated with an authorized user of the ATM. The first ATM may then send, to the mobile device, a push notification indicating the second ATM.

In some arrangements, the first ATM may send, via the first communication interface to a third ATM, a third message indicating a request for cash availability status at the third ATM. The first ATM may receive, from the third ATM, a fourth message indicating a cash availability status at the third ATM.

In some arrangements, the fourth message may comprise an indication that the third ATM contains cash corresponding to the requested cash value. Sending, by the first ATM, the request to pre-stage the transaction at the second ATM may comprise determining that the second ATM is located closer, than the third ATM, to the first ATM.

In some arrangements, the first ATM may send, to an internet of thing (IOT)-enabled module associated with a cash truck, a refill notification. The refill notification may comprise an indication of the first ATM. The first ATM may receive, from the IOT-enabled module, a third message comprising an indication of a location of the cash truck.

In some arrangements, the first ATM may determine, based on the indication of the real-time location of the cash truck, an estimated time of arrival (ETA) of the cash truck. The first ATM may send, to a mobile device, a push notification indicating the ETA of the cash truck.

BRIEF DESCRIPTION OF THE DRAWINGS

The present disclosure is illustrated by way of example and not limited in the accompanying figures in which like reference numerals indicate similar elements and in which:

FIGS. 2A and 2B show an example of cash truck routing based on refill notifications, in accordance with one or more example arrangements;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

ATM networks operated by a bank may be connected to servers (e.g., monitoring and control servers) for facilitating operations and maintenance. A monitoring server may determine operational status at the ATMs, determine faults, determine cash availability status at an ATM, etc. A monitoring server may determine, for example, if an ATM has run out of cash. Based on this determination, a cash truck may be dispatched to refill the ATM. However, a user intending to use the ATM, and the ATM itself, may not be aware of when the ATM would return to operational status. Further, the cash truck may service multiple ATMs and follow a predetermined route without accounting for factors such as rate of cash depletion at ATMs, transaction rates at ATMs, available cash at ATMs, etc. This may result in inefficient refilling operations, further increasing ATM downtimes.

An ATM refilling system with real-time updates is described. The system may comprise a cash dispenser office server that may be communicate with ATMs, in an ATM network, and cash trucks servicing the ATMs. The cash dispenser office server may receive a refill notification from an ATM. The refill notification may comprise, for example, an ATM indicator associated with the ATM. The cash dispenser office server may send, to the ATM, refill information comprising an indication of a cash truck that would refill the ATM. The cash truck may comprise an IOT-enabled module. The IOT-enabled module may send, to the ATM, a message comprising an indication of a real-time location of the cash truck and/or an expected time of arrival (ETA) of the cash truck at a location of the ATM. The real-time location may be the location of the cash truck at that instance in the time or the location of the cash truck at an appropriate amount of time in the past (e.g., thirty seconds, one minutes, a couple minutes, or the like) The ATM may send a push notification, to a mobile device associated with a user of the ATM, comprising an indication of the ETA. A 5G cellular communication protocol may be leveraged to provide a secure communication network comprising the cash dispenser office server, the cash truck, and the ATMs.

Figure 1:
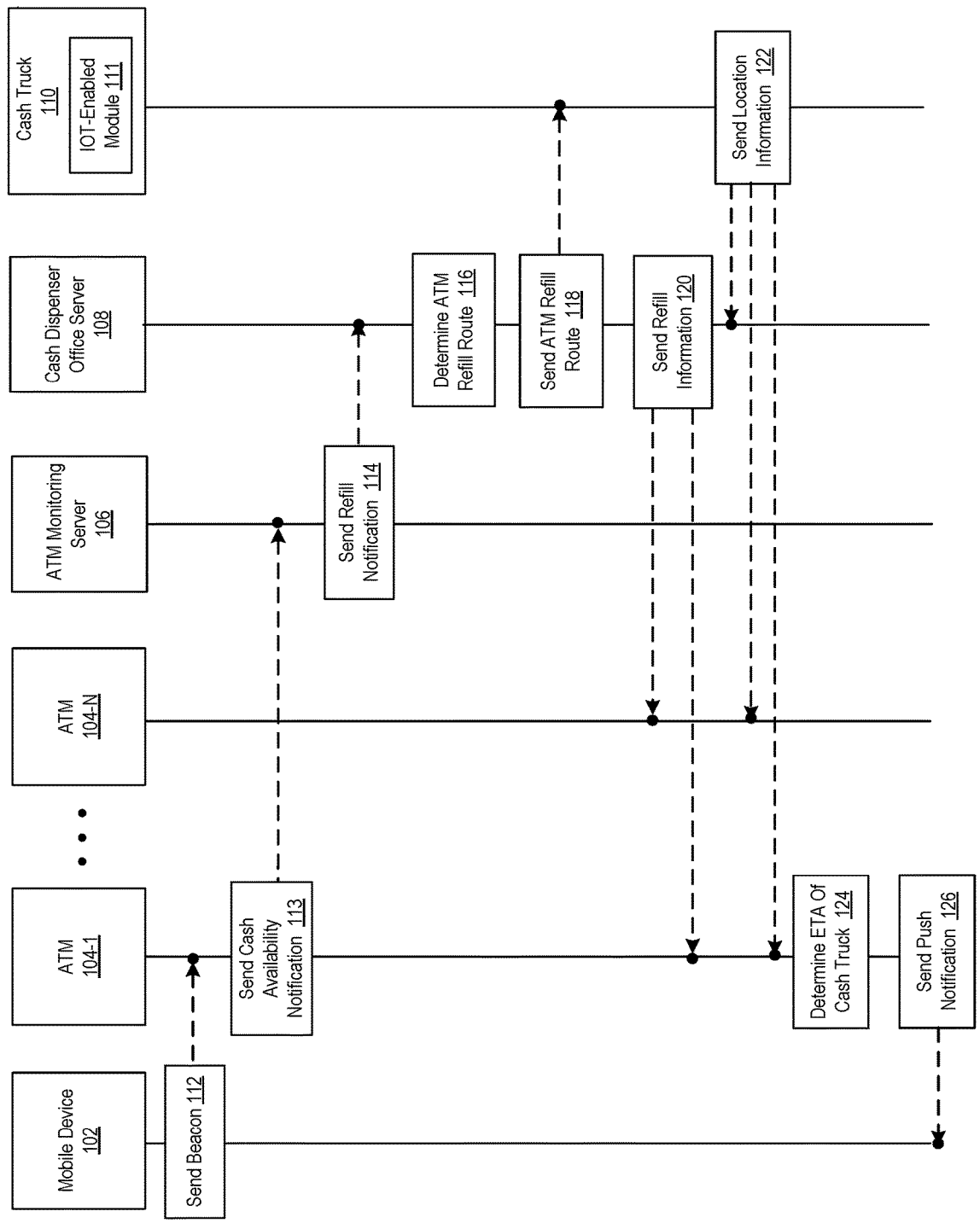
FIG. 1 shows an illustrative event sequence for an ATM refilling operation in a system comprising a plurality of ATMs, in accordance with one or more example arrangements.

FIG. 1 shows an illustrative event sequence for an ATM refilling operation in a system comprising a plurality of ATMs 104, in accordance with one or more example arrangements. The ATMs 104 may be operated by a bank, a financial services provider, and/or the like. The ATMs 104 may correspond to an ATM network associated with a certain geographical region (e.g., a country, a state, a county, a metropolitan region, a city, a locality, etc.).

At step 112, a mobile device 102 may send (e.g., transmit) a beacon signal to an ATM 104-1. The mobile device 102 may be a computing device such as a cellphone, a smartphone, or a tablet computer, etc. An application associated with the bank may be installed on the mobile device 102, and the application may configure the mobile device 102 to transmit the beacon signal. The beacon signal may be transmitted based on a location of the mobile device 102. For example, the mobile device 102 may determine its location (e.g., using a global navigation satellite system (GNSS) module on the mobile device 102, cell tower triangulation techniques, etc.), and determine if it is in the vicinity of any one of the ATMs 104 (locations of which may be stored in a memory of the mobile device 102). The mobile device 102 may transmit the beacon signal based on determining that it is in a vicinity of the ATM 104-1 (e.g., within a threshold distance of the ATM 104-1). In another example, the mobile device 102 may transmit the beacon signal in response to receiving another beacon signal transmitted (e.g., periodically transmitted) by the ATM 104-1. The beacon signal(s) may be near field communication (NFC) protocol signal(s), BLUETOOTH signal(s), International Institution of Electrical and Electronic Engineers (IEEE) 802.11 WIFI signal(s), or signal(s) corresponding to any other wireless communication protocol.

The ATM 104-1 may authenticate the mobile device 102 (e.g., determine that a user of the mobile device 102 is a bank customer) based on the beacon signal. For example, the beacon signal may comprise a one-time pin (OTP) and the ATM 104-1 may authenticate the OTP. The ATM 104-1 may communicate with an ATM monitoring server 106 to authenticate the mobile device 102. The beacon signal and/or the OTP may be configured by the application.

The user may request cash (e.g., corresponding to a cash value) from the ATM 104-1, for example, using an ATM card, a credit card, or the mobile device 102. The user may also request specific cash denominations. The ATM 104-1 may check its cash drawers to determine if there is sufficient cash and/or requested cash denominations for the user. At step 113, the ATM 104-1 may send a cash availability notification message to the ATM monitoring server 106. The cash availability notification message may be sent based on determining that the ATM 104-1 does not have the requested cash (e.g., the ATM 104-1 is out of cash, or has cash that is less than the requested cash value) and/or the requested cash denominations for the user. The cash availability notification message may be sent based on determining that the ATM 104-1 is running low on cash (e.g., available cash value at the ATM 104-1 is lower than a threshold cash value). The cash availability notification message may comprise an indication of the ATM 104-1 (e.g., an ATM identifier, location, etc.). The cash availability notification message may indicate, for the ATM 104-1, one or more of: required cash value, required cash denominations, a time period within which the cash is required, available cash value, available cash denominations, average transaction rate, average cash withdrawal rate, etc. The average transaction rate may be an average number of transactions at the ATM 104-1 in a time interval (e.g., 10 minutes, 1 hour, 6 hours, or any other time interval, etc.). The average cash withdrawal rate may be an average value of cash withdrawn in a time interval.

The ATM monitoring server 106 may monitor operations of ATMs 104. The ATM monitoring server 106 may monitor the operations based on received cash availability notification messages from the ATMs 104. For example, based on receiving the cash availability notification message from the ATM 104-1, the ATM monitoring server 106 may determine that the ATM 104-1 has run out of cash to provide to the user or is running low on cash (e.g., available cash value at the ATM 104-1 is lower than a threshold). The ATM monitoring server 106 may determine a cash dispenser office that is associated with the ATM 104-1. The cash dispenser office may be responsible for servicing the ATM 104-1 (and one or more other ATMs 104 in a geographical area).

At step 114, the ATM monitoring server 106 may send one or more refill notifications to a cash dispenser office server 108 associated with the cash dispenser office. The refill notifications may indicate the ATM 104-1 (and one or more other ATMs 104) that require cash. The refill notifications may indicate one or more of: ATMs 104 to which cash is to be delivered, required cash value/cash denominations to be delivered, times within which the cash is to be delivered, etc.

The refill notifications may comprise other information included in the cash availability notification messages (e.g., available cash value, available cash denominations, average transaction rates, average cash withdrawal rates, etc.).

In an example, the ATM 104-1 may directly communicate with the cash dispenser office server 108 and send a refill notification to the cash dispenser office server 108. For example, the ATM 104-1 may send the refill notification based on determining that the ATM 104-1 does not have the requested cash and/or cash denominations for the user, or is running low on cash (e.g., available cash value at the ATM 104-1 is lower than a threshold). The ATM 104-1 may send the refill notification based on average cash withdrawal rate, average transaction rate, average number of users at the ATM 104-1, etc. For example, the ATM 104-1 may send the refill notification if the average cash withdrawal rate is greater than a threshold, the average transaction rate is greater than a threshold, and/or an average number of users at the ATM 104-1 is greater than the threshold. The ATM 104-1 may determine the average number of users at the ATM 104-1 based on a video/images from a camera at a location of the ATM 104-1.

At step 116, the cash dispenser office server 108 may determine an ATM refill route to be used by a cash truck 110 for cash delivery to the ATMs 104. The refill route may comprise indications of ATMs 104 to be served by the cash truck and/or locations of the ATMs 104. The refill route may be based on the one or more refill notifications received from the ATM monitoring server 106 and/or the ATMs 104. The refill route may prioritize ATMs that have already run out of cash, are running low on cash, and/or are busier (e.g., have higher transaction rates, higher cash withdrawal rates). Determining a refill route may comprise modifying a predetermined route to prioritize the ATMs. With reference to the above example, the cash dispenser office server 108 may prioritize the ATM 104-1 in a refill route based on the refill notification sent by the ATM 104-1 and/or the ATM monitoring server 106.

The cash dispenser office server 108 may further determine, based on the one or more refill notifications, values of cash and/or cash denominations to be delivered to the ATMs 104. The cash dispenser office server 108 may dynamically adjust the values of cash and/or cash denominations based on available cash values, available cash denominations, average transaction rates and/or average cash withdrawal rates at the ATMs 104. For example, a value of cash to be delivered may be proportional to an average transaction rate and/or average cash withdrawal rate. As another example, a value of cash to be delivered may be inversely proportional to an available cash value at an ATM. As another example, the cash dispenser office server 108 may determine that a particular cash denomination is to be delivered based on determining that an ATM has run out of cash corresponding to the cash denomination or a number of banknotes corresponding to the cash denomination is lower than a threshold.

At step 118, the cash dispenser office server 108 may send to, the cash truck 110 (e.g., to an internet-of-things (IOT)-enabled module 111 in the cash truck 110), an indication of the ATM refill route. The cash dispenser office server 108 may further send indications of cash values and/or cash denominations to be delivered to the ATMs 104.

At step 120, the cash dispenser office server 108 may send, to the ATMs 104, refill information. The refill information may comprise an indication of the cash truck 110 (e.g., an indication of the IOT-enabled module 111) servicing the ATMs 104 and/or an indication of the refill route of the cash truck 110. The ATMs 104 may use the indication to communicate with the cash truck 110. If the cash truck 110 has not yet departed the cash dispenser office, the refill information may further comprise an indication of an estimated time of departure of the cash truck 110.

One or more operations described above with reference to the cash dispenser office server 108 may be performed by the IOT-enabled module 111. In an example, the IOT-enabled module 111 of the cash truck 110 may determine the refill route. For example, the cash dispenser office server 108 may send to, the cash truck 110, an indication of the ATM 104-1 which has run out of cash and/or does not have requested cash denominations. The IOT-enabled module 111 may determine, based on the indication of the ATM 104-1, an ATM refill route to be used by the cash truck 110 for cash delivery to the ATM 104-1. The IOT-enabled module 111 may determine a route that prioritizes ATM 104-1.

In an example, the ATM 104-1 may directly communicate with the cash truck 110 and send a refill notification to the cash truck 110. The cash truck 110 may be associated with the ATM 104-1 and the ATM 104-1 may send the refill notification based on the association. The ATM 104-1 may broadcast the refill notification to all cash trucks corresponding to the bank, and the cash truck 110 (e.g., the IOT-enabled module 111) may determine to service the ATM 104-1 based on the association between the cash truck 110 and the ATM 104-1. The IOT-enabled module 111 may determine an ATM refill route to be used by the cash truck 110 for cash delivery to the ATM 104-1, a value of cash to be delivered, cash denominations to be delivered, etc. The IOT-enabled module 111 may determine a route that prioritizes ATM 104-1 based on receiving the refill notification from the ATM 104-1.

At step 122, the IOT-enabled module 111 may broadcast, to the ATMs 104, the location of the cash truck 110 and/or the refill route of the cash truck 110. The location may be determined using a GNSS module (e.g., integrated on the IOT-enabled module 111 or in communication with the IOT-enabled module 111), cell tower triangulation techniques, etc. The IOT-enabled module 111 may send the indication of the location of the cash truck and/or the refill route of the cash truck to the cash dispenser office server 108. The cash dispenser office server 108 may use this information to monitor ATM refilling operations.

The ATMs 104 may use the location information to determine an ETA of the cash truck at the ATMs 104. For example, at step 124, the ATM 104-1 may (i) determine, based on the indication of the cash truck 110 in the refill information, that the cash truck 110 is for refilling the ATM 104-1, and/or (ii) use the broadcast location of the cash truck 110 and/or the refill route of the cash truck 110 to determine an estimated ETA of the cash truck 110 at the ATM 104-1. If the cash truck 110 has not yet departed the cash dispenser office, the ATM 104-1 may further use the estimated time of departure (e.g., as included in the refill information) of the cash truck 110 to determine the ETA.

At step 126, the ATM 104-1 may send a notification (e.g., a push notification, an SMS notification, etc.) to the mobile device 102. The notification may be sent to the mobile device 102 based on receiving the beacon signal from the mobile device 102 and based on determining that the mobile device 102 is associated with the user who requested cash from the ATM 104-1. The notification may comprise one or more of an indication of the ETA of the cash truck 110, an indication of a location of the cash truck 110, an indication of a time at which the ATM 104-1 will be operational, etc. Additionally, or alternatively, the ATM 104-1 may print this information on a receipt that is dispensed to the user.

The ATM monitoring server 106, the cash dispenser office server 108, and/or the IOT-enabled module 111 may be configured to access camera feeds from locations housing the ATMs 104. The camera feeds may be used to determine a level of activity at the ATMs (e.g., a number of people accessing the ATMs 104, queue lengths at the ATMs 104, etc.). The ATM refill route may be determined based on the determined level of activity. For example, the ATM refill route may prioritize an ATM with a higher level of activity (e.g., longer queue length).

One or more of the cash availability notification messages, the refill notifications, and/or other messages as described in the illustrative event sequence of FIG. 1 may be transmitted and received using a 5G communication protocol over wireless networks. Communications between the mobile device 102, the ATMs 104, the ATM monitoring server 106, the cash dispenser office server 108, and the IOT-enabled module 111 may be secured via encryption using private keys. For example, the IOT-enabled module 111 may broadcast messages (e.g., indicating the location of the cash truck 110) that are encrypted using private keys, and the ATMs 104 may decrypt the broadcast messages based on the private keys to determine the location.

FIGS. 2A and 2B show an example of cash truck routing based on refill notifications, in accordance with one or more example arrangements. The cash truck 110 may be configured with a refill route 204 for servicing the ATMs 104. The refill route 204 may be a route connecting, in order, the ATM 104-1, the ATM 104-2, the ATM 104-3, and the ATM 104-4. The ATM 104-4 may send a refill notification 202 to the IOT-enabled module 111 associated with the cash truck 110. The ATM 104-4 may send the refill notification 202 based on determining that the ATM 104-1 does not have requested cash and/or requested cash denominations for the user, or is running low on cash (e.g., available cash value is lower than a threshold). The IOT-enabled module 111 may determine a new refill route 206 based on receiving the refill notification 202. The IOT-enabled module 111 may prioritize the ATM 104-4 (e.g., move the ATM 104-4 higher in an order of ATMs comprising a refill route). As shown in FIG. 2B, the new refill route 206 may be a route connecting, in order, the ATM 104-4, the ATM 104-1, the ATM 104-2, and the ATM 104-3.

Figure 3A:
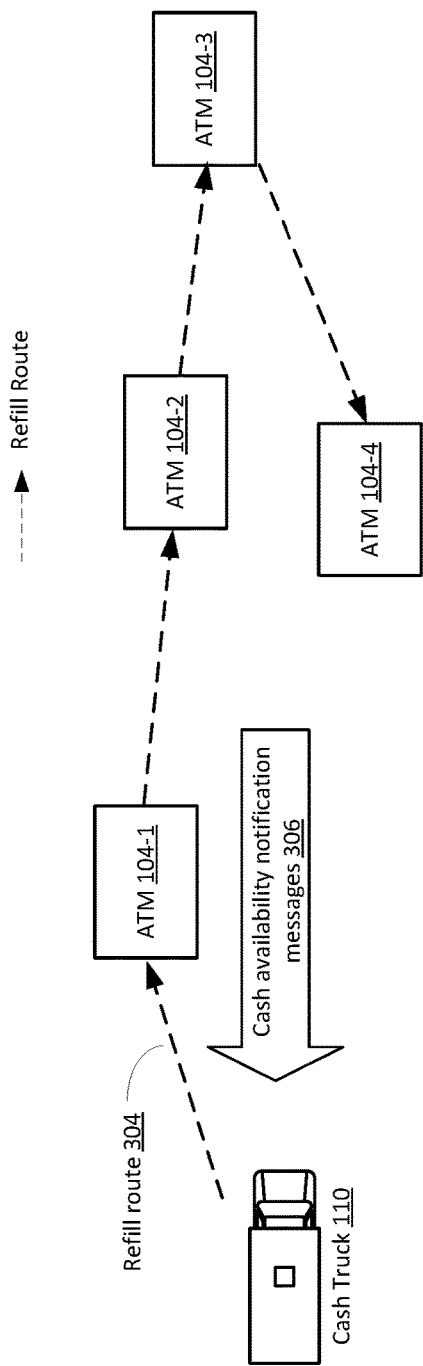
FIGS. 3A and 3B show an example of cash truck routing based on cash availabilities at ATMs, in accordance with one or more example arrangements.
Figure 3B:
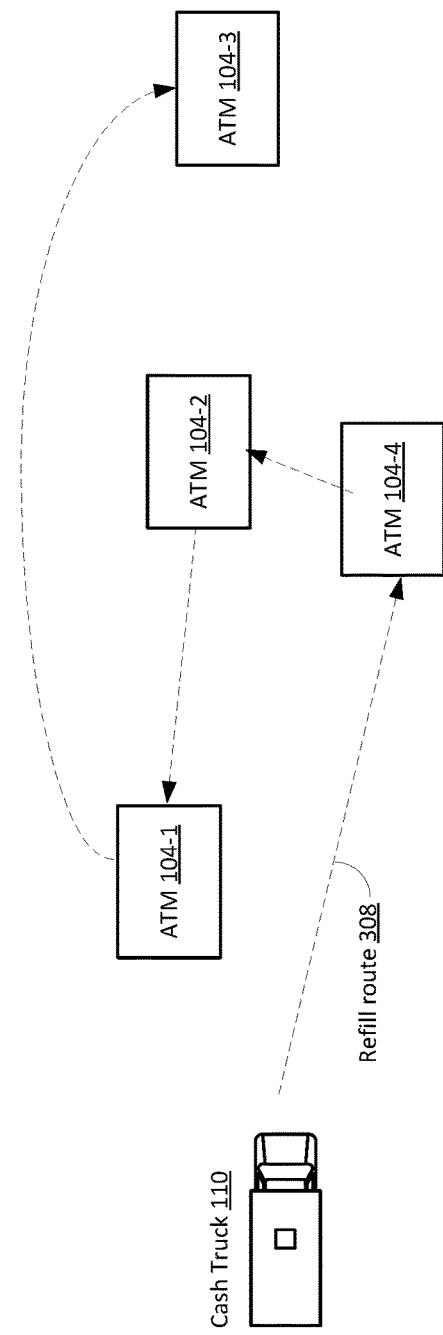

FIGS. 3A and 3B show an example of cash truck routing based on cash availabilities at the ATMs 104, in accordance with one or more example arrangements. The cash truck 110 may be configured with a refill route 304 for servicing the ATMs 104. The ATMs 104 may transmit, to the IOT-enabled module 111, cash availability notification messages 306. The ATMs 104 may transmit the cash availability messages 306 periodically, or in response to request messages from the IOT-enabled module 111. The cash availability notification messages may comprise information associated with usage of the ATMs 104 (e.g., average transaction rate, average cash withdrawal rate, available cash value/cash denominations, etc.). The IOT-enabled module 111 may track, based on the cash availability notification messages 306, available cash supply at the ATMs 104 and determine a refill route connecting the ATMs 104 in an order corresponding to increasing available cash supplies. For example, based on the cash availability notification messages 306, the IOT enabled module may determine that available cash at ATM 104-4 is the lowest among the ATMs and available cash at ATM 104-3 is the highest. The IOT-enabled module 111 may prioritize the ATM 104-4 in a refill route 308 (e.g., move the ATM 104-4 to a first destination in the refill route 308) based on determining that cash value at the ATM 104-4 is the lowest. The ATM 104-3 may be a last ATM in the refill route 308 based on the available cash at the ATM 104-3 being the highest.

The IOT-enabled module 111 may determine a refill route based on estimated times at which ATMs may run out of cash. The IOT-enabled module 111 may determine estimated times for each of the ATMs 104 based on available cash at the ATMs 104 and an average cash withdrawal rate at the ATMs 104. The IOT-enabled module 111 may determine a refill route that prioritizes ATMs which may run out of cash earlier. For example, the IOT-enabled module 111 may determine that the ATM 104-1, the ATM 104-2, the ATM 104-3, and the ATM 104-4 may run out of cash in 3 hours, 2 hours, 4 hours, and 1 hours, respectively. Based on this, the IOT-enabled module 111 may determine the ATM refill route 308 that connects, in order, the ATM 104-4, the ATM 104-2, the ATM 104-1, and the ATM 104-3.

The IOT-enabled module 111 may track levels of activity at the ATMs 104 and prioritize the ATM 104-4 based on determining that the ATM 104-4 has higher activity levels than other ATMs in the refill route 204. The IOT-enabled module 111 may track activity levels at the ATMs 104 using cameras, information indicated in cash availability notification messages (e.g., average transaction rate, average cash withdrawal rate), etc.

An ATM in an ATM network may pre-stage a transaction at another ATM. For example, the ATM may pre-stage a cash withdrawal at a different ATM based on determining that the ATM is unable to service a requested transaction (e.g., the ATM does not have sufficient cash). The ATM may send a notification, to a user mobile device, that indicates alternate ATMs that may be able to service a transaction (e.g., a user request for cash).

Figure 4:
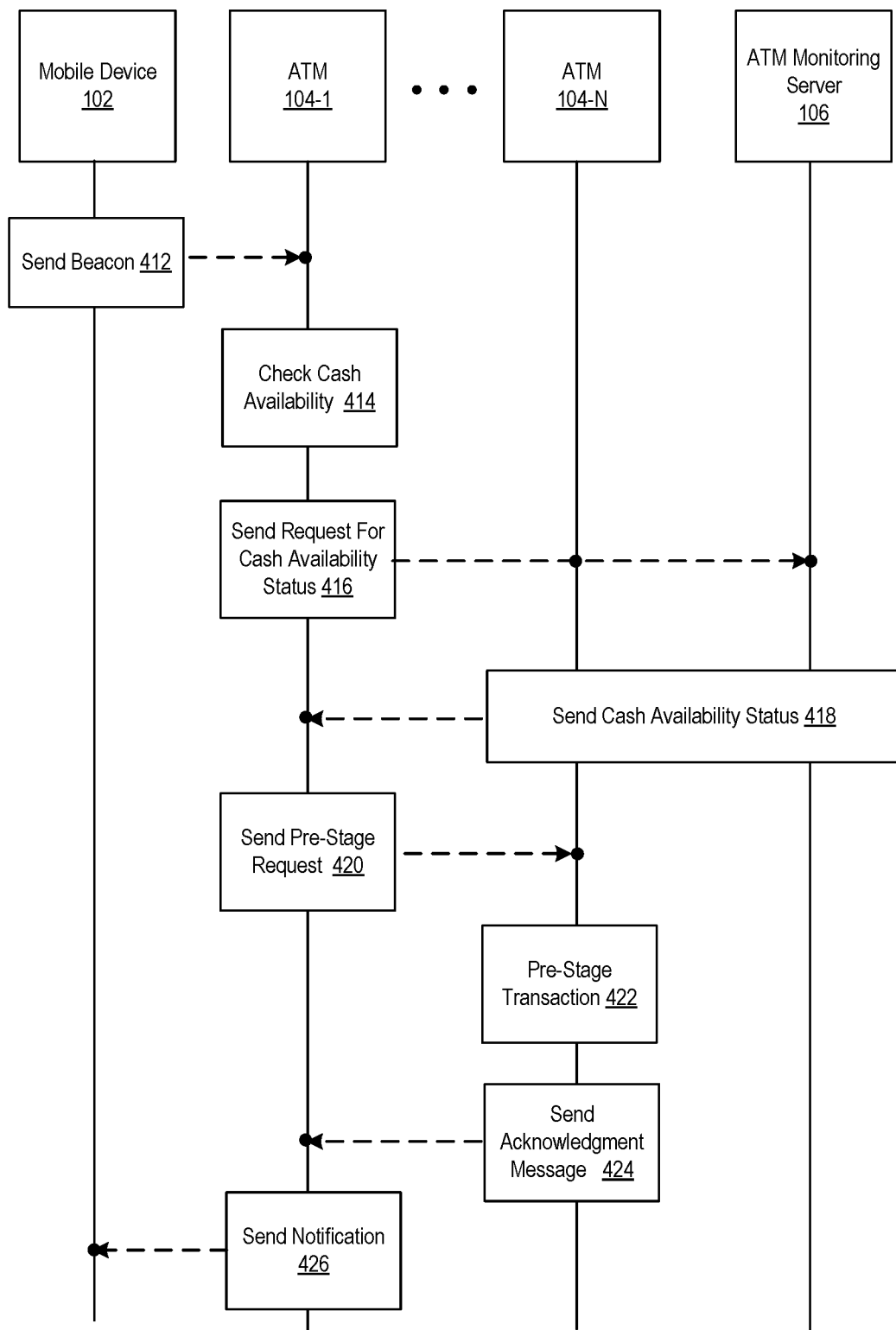
FIG. 4 shows an illustrative event sequence ATM pre-staging an ATM transaction, in accordance with one or more example arrangements.

FIG. 4 shows an illustrative event sequence for pre-staging an ATM transaction, in accordance with one or more example arrangements. At step 412, the mobile device 102 may send (e.g., transmit) a beacon signal to the ATM 104-1. The beacon signal may be similar to the beacon signal described above with reference to FIG. 1. The ATM 104-1 may authenticate the mobile device 102 (e.g., determine that a user of the mobile device 102 is a bank customer) based on the beacon signal. For example, the beacon signal may comprise a one-time pin (OTP) and the ATM 104-1 may the ATM 104-1 may authenticate the OTP. The ATM 104-1 may communicate with an ATM monitoring server 106 to authenticate the mobile device 102.

At step 414, the ATM 414 may check for cash availability at the ATM 104-1. The user may request cash (e.g., corresponding to a cash value) from the ATM 104, for example, using an ATM card, a credit card, or the mobile device 102. The user may also request specific cash denominations. The ATM 104-1 may check the cash drawer to determine if there is sufficient cash and/or requested cash denominations for fulfilling the user request.

At step 416, the ATM 104-1 may send, to other ATMs 104, respective request messages for requesting cash availability statuses at the other ATMs 104. The ATM 104-1 may send the requests to other ATMs in the vicinity of the ATM 104-1 and/or may send a request to the ATM monitoring server 106. The requests may be sent based on determining, at the ATM 104-1, that the ATM 104-1 does not have the requested cash (e.g., available cash value at the ATM 104-1 is less than a requested cash value) and/or the requested cash denominations for the user. The request messages may comprise indications of the requested cash value and/or the requested cash denominations.

At step 418, the ATMs 104 may send, responsive to the request messages, respective cash availability status messages to the ATM 104-1. A cash respective availability status message corresponding to an ATM may comprise indications of available cash value at the ATM, available cash denominations at the ATM, etc. A cash availability status message corresponding to an ATM may comprise an indication of whether the ATM has the requested cash and/or the requested cash denominations. Additionally, or alternatively, the ATM monitoring server 106 may send one or more cash availability status messages to the ATM 104-1, wherein the one or more cash availability status messages comprise one or more of: an indication of available cash at the ATM, an indication of available cash denominations at the ATM, indications of ATMs in the ATM network that have the requested cash and/or cash denominations, etc.

At step 420, the ATM 104-1 may send a pre-stage request message to the ATM 104-N. The ATM 104-1 may send the pre-stage request message to the ATM 104-N based on determining that the ATM 104-N has the requested cash and/or the requested cash denominations for the user. The ATM 104-N may be a nearest ATM to the ATM 104-1 with the requested cash and/or requested cash denominations. The pre-stage request may indicate a request for the ATM 104-N to reserve the requested cash and/or the requested cash denominations for the user. The pre-stage request may comprise an indication of the user (e.g., an account associated with the user, a debit card number associated with the user, a credit card number associated with the user, etc.), an indication of requested cash value, and/or an indication of requested cash denominations.

At step 422, the ATM 104-N may pre-stage a transaction based on receiving the pre-stage request. For example, the ATM 104-N may reserve (e.g., for a pre-defined time period) the requested cash and/or cash denominations for the user. At step 424, the ATM 104-N may send, to the ATM 104-1, an acknowledgment message indicating that the ATM 104-N has pre-staged the transaction for the user. The acknowledgment message may indicate a time period for which the ATM 104-N has reserved the cash.

At step 426, the ATM 104-1 may send, to the mobile device 102, a notification indicating that the ATM 104-N has pre-staged the transaction. The notification may comprise (e.g., a push notification, an SMS notification, etc.) location information corresponding to the ATM 104-N. The notification may comprise an indication of a time period for which the requested cash/cash denominations will be reserved at the ATM 104-N. The notification may comprise an indication of a time until which the requested cash/cash denominations will be reserved at the ATM 104-N. Additionally, or alternatively, the ATM 104-1 may print this information on a receipt that is dispensed to the user.

The illustrative event sequence of FIG. 4 may also be used for other ATM operations. For example, a user may want to deposit cash, deposit checks, and/or check account balances at an ATM. If the ATM is unable to perform an operation (e.g., due to technical issues), it may query nearby ATMs to determine if the operation is functional at the nearby ATMs. In an example where a user wants to deposit a check and the ATM 104-1 is unable to perform this operation, the ATM 104-1 may send a request, to another ATM 104-N in proximity to the ATM 104-1, for status of a check deposit system at the ATM 104-N. The other ATM 104-N may respond with a message indicating whether the check deposit system at the ATM 104-N is functional or not. If the message indicates that the check deposit system is functional at the ATM 104-N, the ATM 104-1 may send a notification, to the mobile device 102, indicating the ATM 104-N (e.g., a location of the ATM 104-N).

Figure 5A:
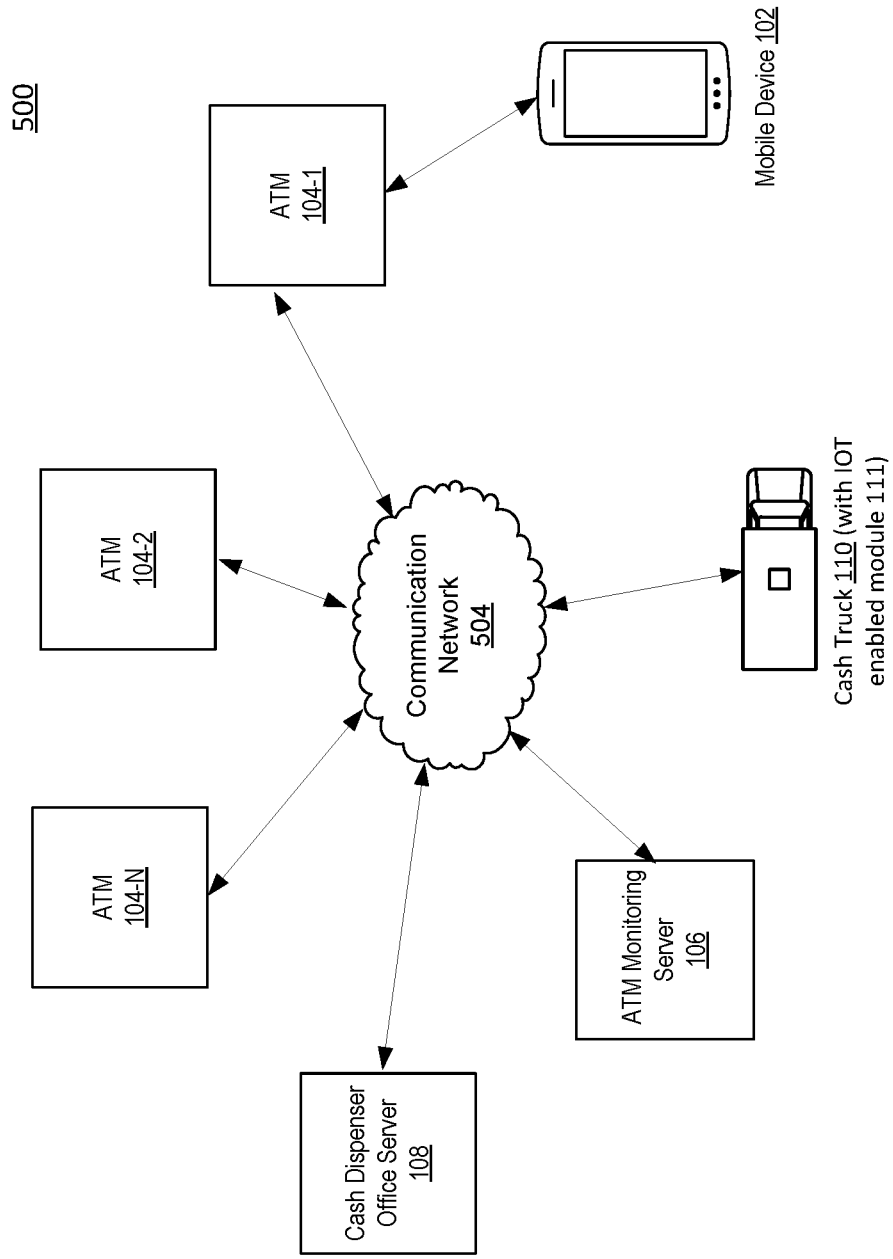
FIG. 5A depicts an illustrative computing environment for an ATM network, in accordance with one or more example arrangements.

FIG. 5A depicts an illustrative computing environment 500 for an ATM network, in accordance with one or more arrangements. The computing environment 500 may comprise one or more devices (e.g., computer systems, communication devices, etc.). The computing environment 500 may comprise, for example, the mobile device 102, the ATMs 104, the ATM monitoring server 106, the cash dispenser office server 108, the IOT enabled module 111 (in the cash truck 110), and/or the like. One or more of the devices and/or systems, may be linked over a secure private communication network 504. The communication network 504 may use wired and/or wireless communication protocols. For example, the ATMs 104 and the cash truck 110 may communicate using a 5G cellular communication protocol; the ATMs 104, the cash dispenser office server 108, the ATM monitoring server 106 may communicate via transmission control protocol/internet protocol (TCP/IP); and the ATM 104-1 and the mobile device 102 may communicate via a WIFI protocol, an NFC protocol, or a 5G cellular communication protocol. In one example, objects (e.g., ATM 104-1, ATM monitoring server 106, cash dispenser office server 108, cash truck 110) on the communication network 504 are connected via a mesh network in which objects may communicate directly with each other. In other examples, objects may be connected in a modified hub-spoke network configuration in which some objects may communicate with a centralized/regional server (e.g., cash dispenser office server 108) that relays messages/requests to appropriate recipient objects. In such an example, a first ATM 104-1 communicates directly over the communication network 504 with a second ATM 104-2 within its vicinity, but the first ATM 104-1 communicates through a centralized/regional server (e.g., cash dispenser office server 108) to interact with a third ATM 104-3, which is located at an unreachable distance from the first ATM. The communication network's topography may be dynamic in some examples where objects on the network, such as a cash truck 110, might not have a fixed/static position, therefore, may be in the vicinity of an ATM 104-1 at one point in time, but at an unreachable distance from the ATM 104-1 at a later time.

The ATM monitoring server 106 may comprise one or more computing devices and/or other computer components (e.g., processors, memories, communication interfaces). The ATM monitoring server 106 may be used for monitoring and authenticating ATM operations. For example, the ATM monitoring server 106 may authenticate an ATM card of a user, check user account balances, and/or authorize a user transaction at an ATM. The ATM monitoring server 106 may also monitor the ATM network for any errors in operation of the ATMs, monitor cash availabilities at the ATMs (e.g., via cash availability notification messages from the ATMs, monitor ATM usage (e.g., average transaction rates, average cash withdrawal rates), etc.

Figure 5B:
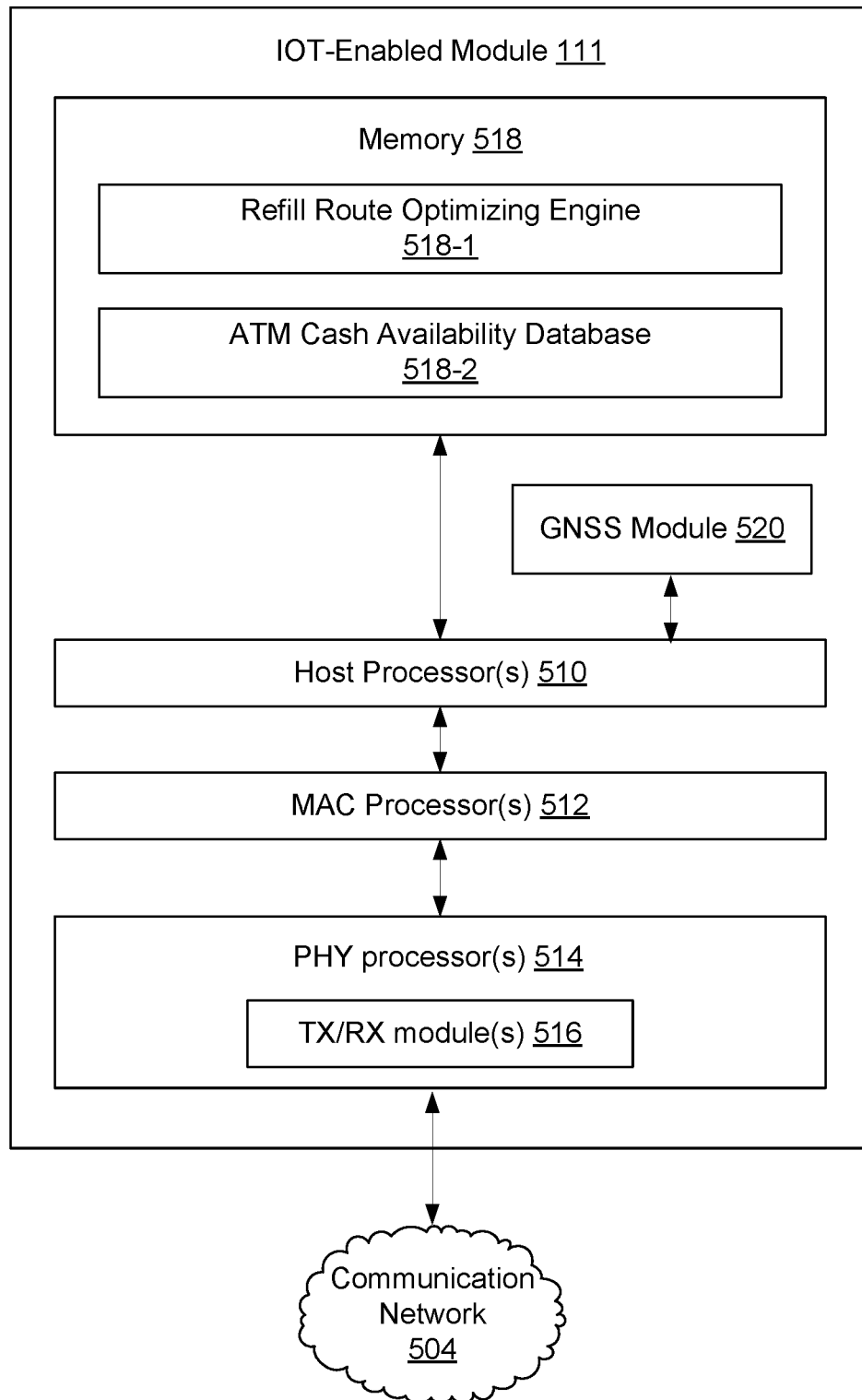
FIG. 5B shows an example IOT-enabled module, in accordance with one or more example arrangements.

FIG. 5B shows an example IOT-enabled module 111 in accordance with one or more examples described herein. The IOT-enabled module 111 may comprise one or more of host processor(s) 510, medium transaction control (MAC) processor(s) 512, physical layer (PHY) processor(s) 514, transmit/receive (TX/RX) module(s) 516, memory 518, GNSS module 520, and/or the like. One or more data buses may interconnect host processor(s) 510, MAC processor(s) 512, PHY processor(s) 514, Tx/Rx module(s) 516, memory 518, and/or the GNSS module 520. The IOT-enabled module 111 may be implemented using one or more integrated circuits (ICs), software, or a combination thereof, configured to operate as discussed below. The host processor(s) 510, the MAC processor(s) 512, and the PHY processor(s) 514 may be implemented, at least partially, on a single IC or multiple ICs. Memory 518 may be any memory such as a random-access memory (RAM), a read-only memory (ROM), a flash memory, or any other electronically readable memory, or the like. The GNSS module 520 may be a global positioning system (GPS) module, a global navigation satellite system (GLONASS) module, or an equivalent. The GNSS module 520 may be configured to determine GNSS coordinates associated with a location of the IOT-enabled module 111.

Messages transmitted from and received at devices in the computing environment 500 may be encoded in one or more MAC data units and/or PHY data units. For example, the MAC processor(s) 512 and/or the PHY processor(s) 514 of the IOT-enabled module 111 are configured to generate data units, and process received data units, that conform to any suitable wired and/or wireless communication protocol. For example, the MAC processor(s) 512 may be configured to implement MAC layer functions, and the PHY processor(s) 514 may be configured to implement PHY layer functions corresponding to the communication protocol. The MAC processor(s) 512 may, for example, generate MAC data units (e.g., MAC protocol data units (MPDUs)), and forward the MAC data units to the PHY processor(s) 514. The PHY processor(s) 514 may, for example, generate PHY data units (e.g., PHY protocol data units (PPDUs)) based on the MAC data units. The generated PHY data units may be transmitted via the TX/RX module(s) 516 over the communication network 504. Similarly, the PHY processor(s) 514 may receive PHY data units from the TX/RX module(s) 516, extract MAC data units encapsulated within the PHY data units, and forward the extracted MAC data units to the MAC processor(s). The MAC processor(s) 512 may then process the MAC data units as forwarded by the PHY processor(s) 514.

One or more processors (e.g., the host processor(s) 510, the MAC processor(s) 512, the PHY processor(s) 514, and/or the like) of the IOT-enabled module 111 may be configured to execute machine readable instructions stored in memory 518. The memory 518 may comprise (i) one or more program modules/engines having instructions that when executed by the one or more processors cause the IOT-enabled module 111 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the IOT-enabled module 111 and/or by different computing devices that may form and/or otherwise make up the IOT-enabled module 111. For example, memory 518 may have, store, and/or comprise a refill route optimizing engine 518-1, and an ATM cash availability database 518-2. The refill route optimizing engine 518-1 may have instructions that direct and/or cause the IOT-enabled module 111 to perform one or more operations as discussed herein (e.g., determining an ATM refill route, sending cash truck location information, determining cash value/denominations to be delivered etc.). The ATM cash availability database 518-2 may store information associated with cash availability at the ATMs 104, information associated with received refill notifications from the ATMs 104, etc. For example, the cash availability database 518-2 may store, for each ATM 104, information corresponding to an average transaction rate, an average cash withdrawal rate, available cash value/cash denominations at the ATM, a queue length at the ATM, required cash value, required cash denominations, a time period within which cash is required, available cash value, etc. The cash availability database 518-2 may be populated/updated based on cash availability notifications and/or refill notifications sent by the ATMs 104.

Figure 5C:
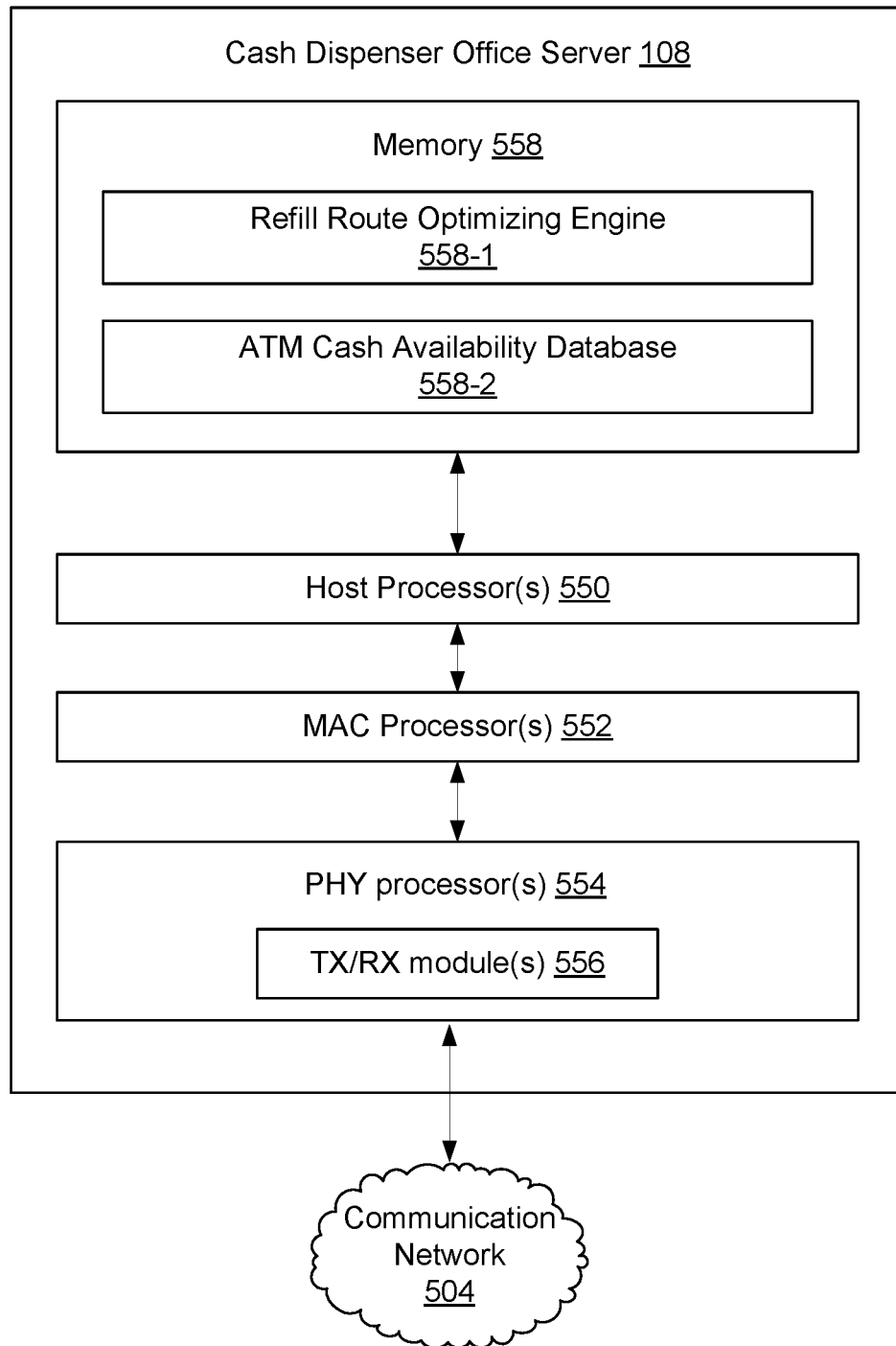
FIG. 5C shows an example cash dispenser office server, in accordance with one or more example arrangements.

FIG. 5C shows an example cash dispenser office server 108 in accordance with one or more examples described herein. The cash dispenser office server 108 may comprise one or more of host processor(s) 550, medium transaction control (MAC) processor(s) 552, physical layer (PHY) processor(s) 554, transmit/receive (TX/RX) module(s) 556, memory 558, and/or the like. One or more data buses may interconnect host processor(s) 550, MAC processor(s) 552, PHY processor(s) 554, Tx/Rx module(s) 556, and/or memory 558. The cash dispenser office server 108 may be implemented using one or more integrated circuits (ICs), software, or a combination thereof, configured to operate as discussed below. The host processor(s) 550, the MAC processor(s) 552, and the PHY processor(s) 554 may be implemented, at least partially, on a single IC or multiple ICs. Memory 558 may be any memory such as a random-access memory (RAM), a read-only memory (ROM), a flash memory, or any other electronically readable memory, or the like. The MAC processor(s) 552, the PHY processors 554, and the Tx/Rx module(s) 556 may transmit, receive and/or process PPDUs and MPDUs in a manner similar to described above with reference to the MAC processor(s) 512, the PHY processors 514, and the Tx/Rx module(s) 516.

One or more processors (e.g., the host processor(s) 550, the MAC processor(s) 552, the PHY processor(s) 554, and/or the like) of the cash dispenser office server 108 may be configured to execute machine readable instructions stored in memory 558. The memory 558 may comprise (i) one or more program modules/engines having instructions that when executed by the one or more processors cause the cash dispenser office server 108 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the cash dispenser office server 108 and/or by different computing devices that may form and/or otherwise make up the cash dispenser office server 108. For example, memory 558 may have, store, and/or comprise a refill route optimizing engine 558-1, and an ATM cash availability database 558-2. The refill route optimizing engine 558-1 may have instructions that direct and/or cause the cash dispenser office server 108 to perform one or more operations as discussed herein (e.g., receiving refill notifications, determining an ATM refill route, etc.). The ATM cash availability database 558-2 may store information associated with cash availability at the ATMs 104, information associated with received refill notifications, etc. For example, the cash availability database 558-2 may store, for each ATM 104, information corresponding to an average transaction rate, an average cash withdrawal rate, available cash value/cash denominations at the ATM, a queue length at the ATM, required cash value, required cash denominations, a time period within which the cash is required, available cash, etc. The cash availability database 558-2 may be populated/updated based on cash availability notifications and/or refill notifications sent by the ATMs 104.

While FIG. 5A illustrates the cash dispenser office server 108 as being separate from other elements connected in communication network 504, in one or more other arrangements, the cash dispenser office server 108 may be included in the ATM monitoring server 106. Elements in the cash dispenser office server 108 (e.g., the host processor(s) 550, the memory(s) 558, the MAC processor(s) 552, the PHY processor(s) 554, and the TX/RX module(s) 556, one or more program modules stored in the memory(s) 558) may share hardware and software elements with and corresponding to, for example, the ATM monitoring server 106.

Figure 6:
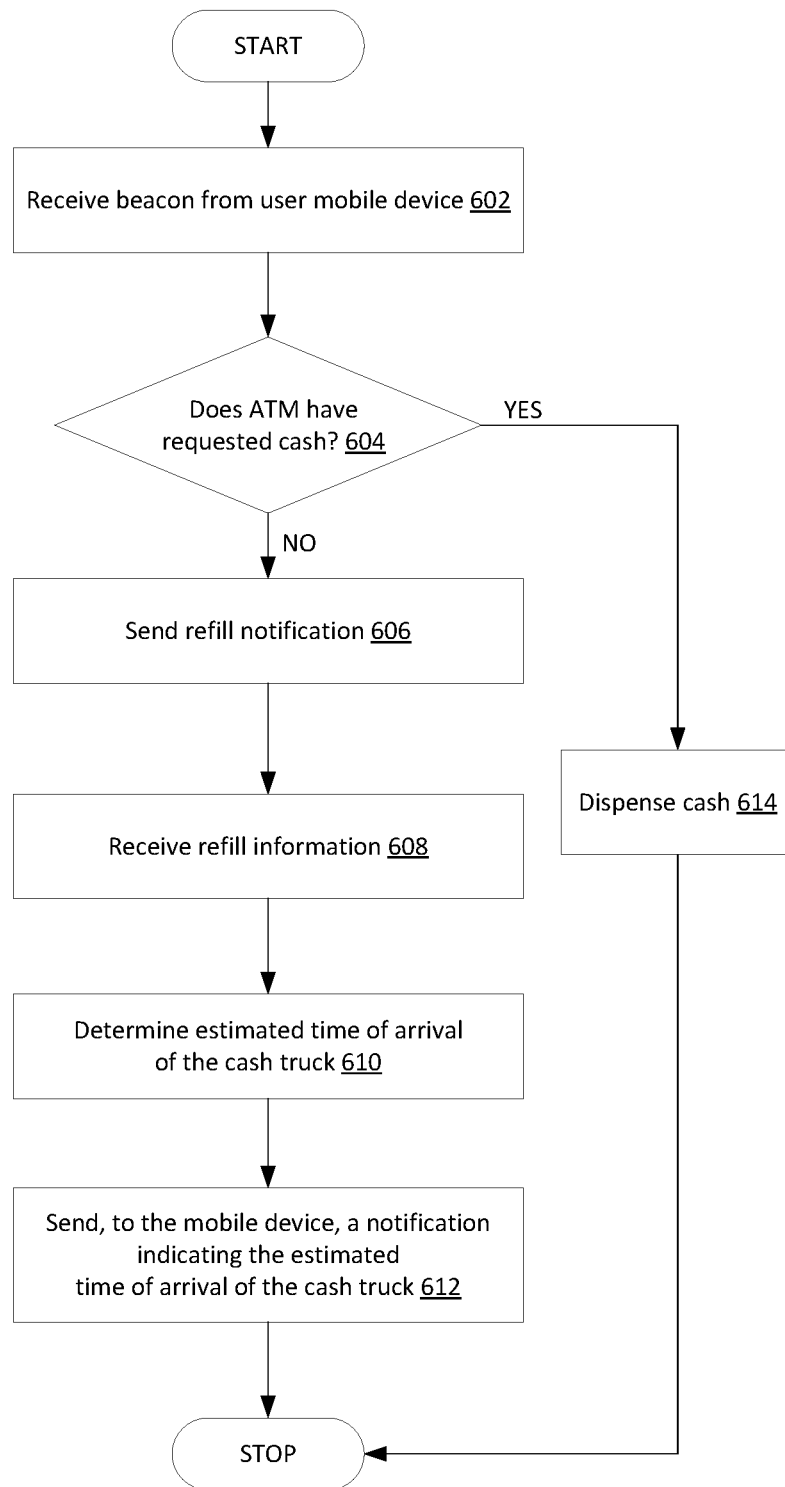
FIG. 6 shows an illustrative algorithm for tracking an ATM refilling operation, in accordance with one or more example arrangements.

FIG. 6 shows an illustrative algorithm for tracking an ATM refilling operation, in accordance with one or more example arrangements. At step 602, an ATM may receive, from a mobile device, a beacon signal. The ATM may authenticate the beacon signal and determine that the mobile device is associated with an authorized user of the ATM. The user may use an ATM card or the mobile device to request cash from the ATM. The ATM (and/or an ATM monitoring server connected to the ATM) may determine whether the user has a valid balance in a bank account associated with the user.

At step 604, the ATM may determine whether it has the cash and/or cash denominations as may be requested by the user. For example, the ATM may check the cash drawers to determine whether the user request for cash can be fulfilled. At step 614, the ATM may dispense the requested cash if the ATM has the requested cash and/or cash denominations.

If the ATM determines that it does not have the requested cash and/or cash denominations, at step 606, the ATM may send a refill notification. The ATM may send a refill notification to a cash truck (e.g., an IOT module associated with a cash truck) and/or a server associated with an ATM network (e.g., the ATM monitoring server, a cash dispenser office server, etc.). The refill notification may comprise one or more of an indication of the ATM, an indication of requested cash value, an indication of the requested cash denominations, an indication of a time within which the cash is required at the ATM, etc.

At step 608, the ATM may receive, from the cash truck and/or the server, refill information. The refill information may comprise one or more of an indicator of the cash truck, a current location of the cash truck (e.g., GPS coordinates of the cash truck, etc.), a refill route associated with the cash truck, etc.

At step 610, the ATM may determine, based on the refill information, an ETA of the cash truck at the ATM. Determining the ETA may comprise determining a current location of the cash truck and a number of other ATMs that the cash truck is servicing prior to arriving at the ATM. The ATM may further consider an average time required to service (e.g., time required to refill) an ATM.

At step 612, the ATM may send, to the wireless device, a notification (e.g., a push notification). The notification may comprise indications of one or both of the ETA of the cash truck and the current location of the cash truck.

Figure 7:
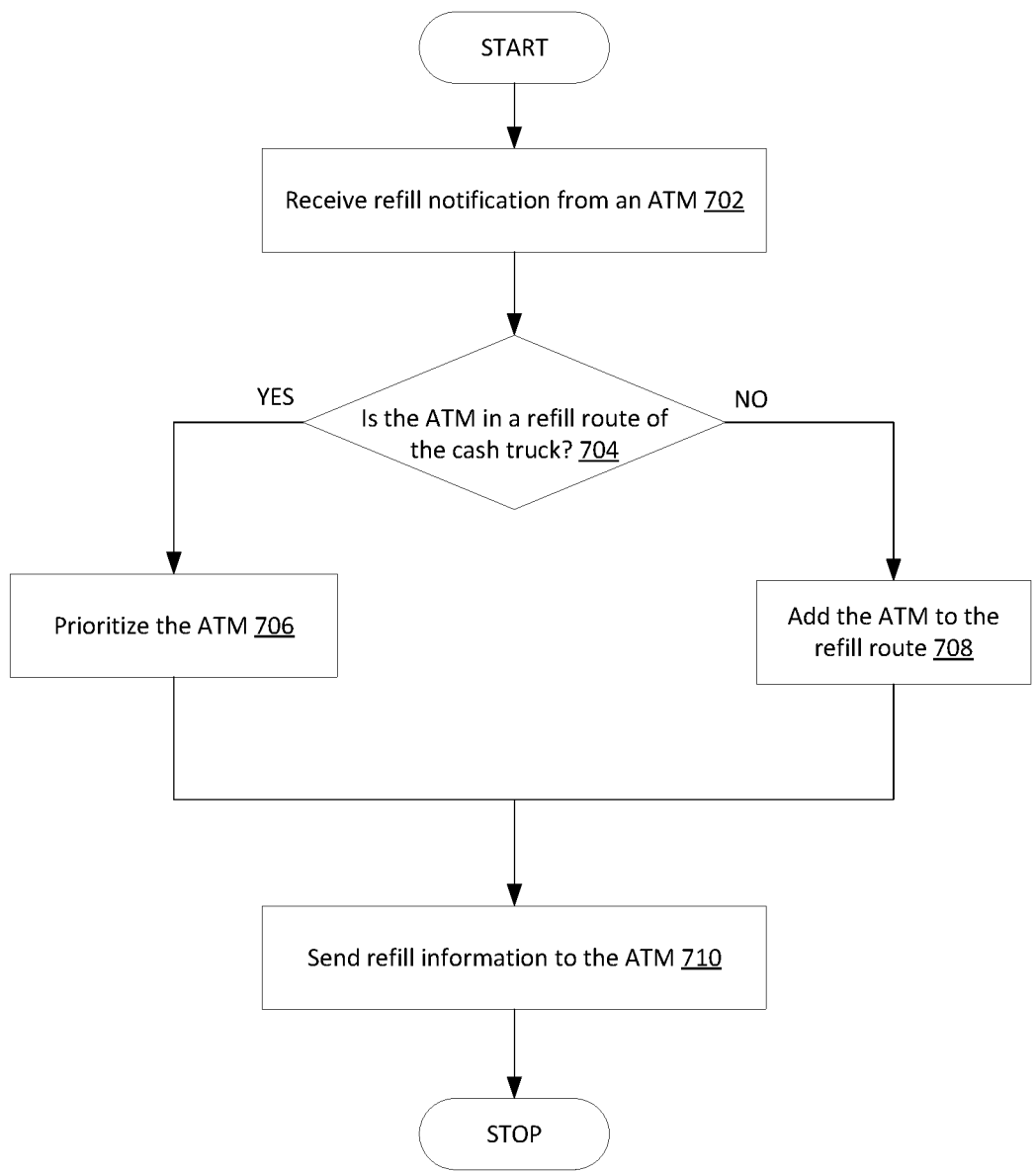
FIG. 7 shows an illustrative algorithm for modifying an ATM refilling operation, in accordance with one or more example arrangements.

FIG. 7 shows an illustrative algorithm for modifying an ATM refilling operation, in accordance with one or more example arrangements. At step 702, a computing device (e.g., a cash dispenser office server or an IOT-enabled module associated with a cash truck) may receive a refill notification from an ATM.

At step 704, the computing device may determine whether the ATM is in a refill route associated with a cash truck. If the ATM is in a refill route associated with the cash truck, at step 706, the computing device may prioritize the ATM (e.g., move the ATM higher in an order of ATMs corresponding to the ATM refill route). If the ATM is not in a refill route associated with the cash truck, at step 708, the computing device may add the ATM to the refill route. For example, the computing device may move the ATM higher in a list of ATMs associated with the refill route. The computing device may determine an ETA of the cash truck at the ATM. At step 710, the computing device may send refill information to the ATM. The refill information may comprise an indication of the refill route and/or an ETA of the cash truck.

Figure 8:
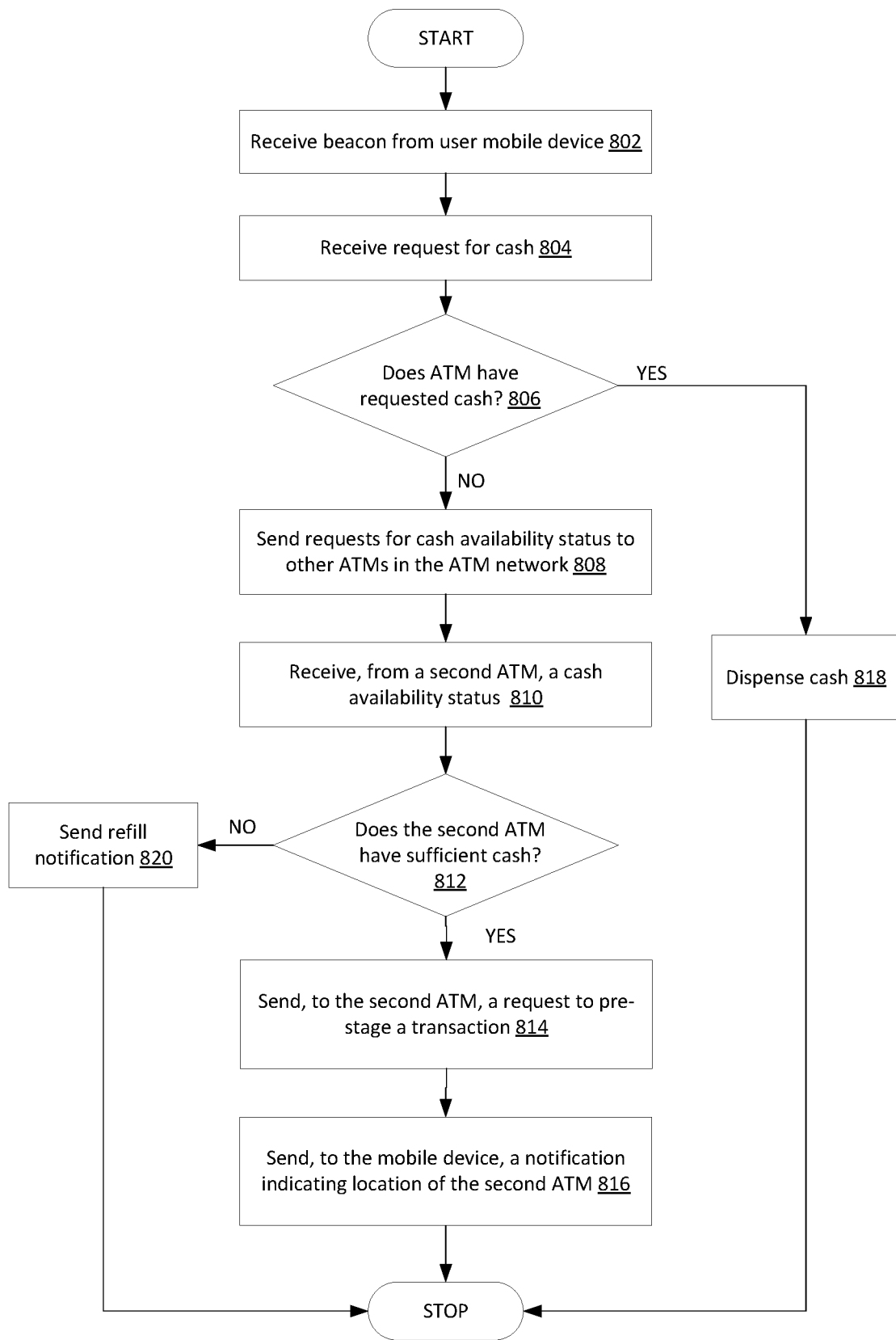
FIG. 8 shows an illustrative algorithm for pre-staging an ATM transaction, in accordance with one or more example arrangements.

FIG. 8 shows an illustrative algorithm for pre-staging an ATM transaction, in accordance with one or more example embodiments. At step 802, an ATM may receive, from a mobile device, a beacon. The ATM may authenticate the beacon signal and determine that the mobile device is associated with an authorized user of the ATM.

At step 804, the user may request cash from the ATM. For example, the user may use an ATM card or the mobile device to request cash from the ATM. The ATM (and/or an ATM monitoring server connected to the ATM) may determine whether the user has a valid balance in a bank account associated with the user.

At step 806, the ATM may determine whether it has the cash and/or cash denominations as may be requested by the user. For example, the ATM may check the cash drawers to determine whether the user request for cash can be fulfilled. At step 818, the ATM may dispense the requested cash if the ATM has the requested cash and/or cash denominations.

If the ATM does not have the requested cash and/or cash denominations, at step 808, the ATM may send requests for cash availability status to other ATMs in an ATM network. The other ATMs may be in a proximity (e.g., within a specified radius) of the ATM. The requests for cash availability status may comprise indications of requested cash value and/or requested cash denominations.

At step 810, the ATM may receive, from a second ATM and in response to a request for cash availability status, a message indicating a cash availability status at the second ATM. The message may indicate, for example, whether the second ATM has the requested cash and/or cash denominations, available cash value and/or cash denominations at the second ATM, etc.

At step 812, the ATM may determine, based on the received message from the second ATM, whether the second ATM has the requested cash and/or cash denominations. If the second ATM (and/or other ATMs in the ATM network) does not have the requested cash and/or cash denominations, at step 820, the ATM may send (e.g., to a cash truck and/or to a server) a refill notification (e.g., a refill notification as described above with reference to FIG. 1, 2A, or 6).

If the second ATM (and/or other ATMs in the ATM network) has the requested cash and/or cash denominations, the ATM may send, at step 814, to the second ATM, a request to pre-stage a transaction (e.g., a cash withdrawal transaction) at the second ATM. The request to pre-stage may comprise, for example, an indication of the requested cash value and/or cash denominations. The ATM may also send (e.g., to a cash truck and/or to a server) a refill notification. At step 816, the ATM may send, to the mobile device, a notification indicating a location of the second ATM.

Figure 9:
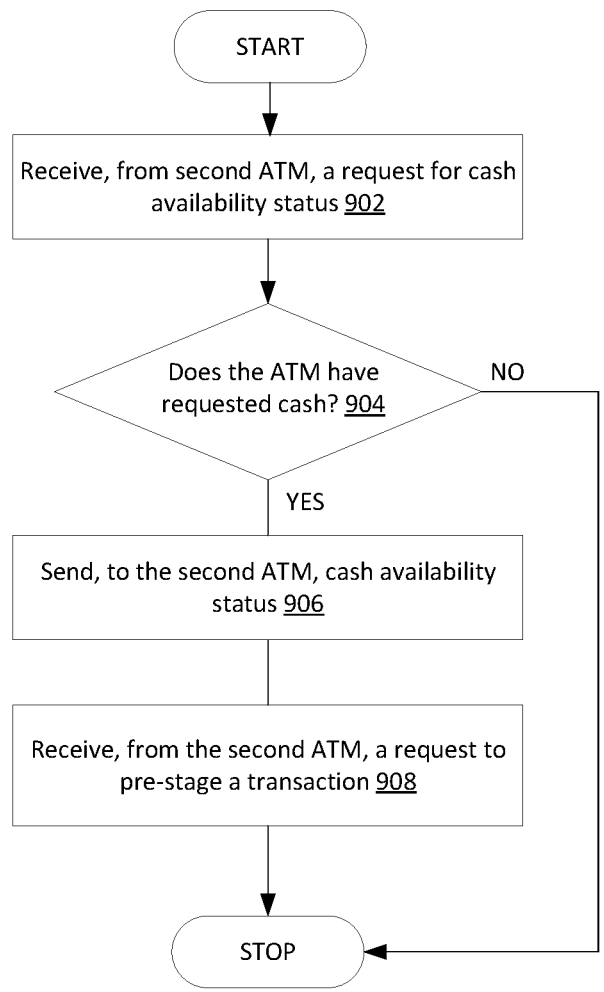
FIG. 9 shows an illustrative algorithm for pre-staging an ATM transaction, in accordance with one or more example arrangements.

FIG. 9 shows an illustrative algorithm for pre-staging an ATM transaction, in accordance with one or more example embodiments. At step 902, an ATM may receive, from a second ATM, a request for cash availability status. The request may comprise an indication of requested cash value and/or cash denominations.

At step 904, the ATM may determine whether it has the requested cash and/or cash denominations. For example, the ATM may check the cash drawers to determine whether it has the requested cash and/or cash denominations. At step 906, the ATM may send, to the second ATM, a message indicating a cash availability status at the second ATM if the ATM has the requested cash and/or cash denominations. The message may comprise an indication that the ATM has the requested cash and/or cash denominations.

At step 908, the ATM may receive, from the second ATM, a request to pre-stage a transaction (e.g., a cash withdrawal transaction). The request may comprise an indication of the requested cash value and/or cash denominations. Based on the request, the ATM may reserve the requested cash and/or cash denominations for a user.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

We claim:

1. An automatic teller machine (ATM) refilling system with real-time updates, the system comprising:
  a cash dispenser server comprising at least one first processor, a first communication interface communicatively coupled to the at least one first processor, and a first memory storing first computer-readable instructions that, when executed by the at least one first processor, cause the cash dispenser server to:
    receive, via the first communication interface, a refill notification from an ATM, the refill notification comprising an indicator associated with the ATM; and
    send, to the ATM, refill information comprising an indication of a cash truck; and
  a module, associated with the cash truck, comprising at least one second processor, a second communication interface communicatively coupled to the at least one second processor, a global positioning system (GPS) module, and a second memory storing second computer-readable instructions that, when executed by the at least one second processor, cause the module to:
    send, via the second communication interface to the ATM, a message comprising an indication of a location of the cash truck captured by the GPS module.

2. The system of claim 1, wherein the ATM comprises at least one third processor, a third communication interface communicatively coupled to the at least one third processor, and a third memory storing third computer-readable instructions that, when executed by the at least one third processor, cause the ATM to:
  send, via the third communication interface, a push notification to a mobile device.

3. The system of claim 2, wherein the third computer-readable instructions, when executed by the at least one third processor, cause the ATM to:
  determine, based on the indication of the location of the cash truck, an estimated time of arrival (ETA) of the cash truck, wherein the push notification comprises the ETA of the cash truck.

4. The system of claim 2, wherein the mobile device comprises at least one fourth processor, a fourth communication interface communicatively coupled to the at least one fourth processor, and a fourth memory storing fourth computer-readable instructions that, when executed by the at least one fourth processor, cause the mobile device to:

send, via the fourth communication interface, a beacon signal comprising a mobile device indicator;

wherein the third computer-readable instructions, when executed by the at least one third processor, cause the ATM to:

determine, based on the beacon signal, that the mobile device is associated with an authorized user of the ATM.

5. The system of claim 2, wherein the third computer-readable instructions, when executed by the at least one third processor, cause the ATM to send the refill notification based on at least one selected from:

available cash at the ATM;
available denominations at the ATM;
average cash withdrawal rate;
average transaction rate at the ATM;
average number of users at the ATM;
and combination thereof.

6. The system of claim 1, wherein the first computer-readable instructions, when executed by the at least one first processor, cause the cash dispenser server to:

determine, based on the refill notification, a refill route for the cash truck, wherein the refill route comprises the ATM and one or more second ATMs; and send, to the module, an indication of the refill route.

7. The system of claim 6, wherein the determining the refill route comprises modifying a default refill route, comprising the ATM and the one or more second ATMs, to prioritize the ATM.

8. The system of claim 6, wherein the message further comprises the indication of the refill route.

9. The system of claim 1, wherein the first computer-readable instructions, when executed by the at least one first processor, cause the cash dispenser server to:

send, to the module, an indication of cash value to be delivered to the ATM.

10. The system of claim 1, wherein the indication of the cash truck is an indication of the module associated with the cash truck.

* * * * *

UNITED STATES PATENT AND TRADEMARK OFFICE
CERTIFICATE OF CORRECTION

PATENT NO. : 11,195,387 B1
APPLICATION NO. : 16/887548
DATED : December 7, 2021
INVENTOR(S) : Chauhan et al.

Page 1 of 1

It is certified that error appears in the above-identified patent and that said Letters Patent is hereby corrected as shown below:

On the Title Page

Column 1, (22) Filed, Line 1:
After "2020", insert --¶(65) Prior Publication Data
US 2021/0375103 A1 Dec. 2, 2021--

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*